Feb. 6, 1923.
J. A. TRUESDELL.
SEAT ATTACHMENT FOR MOTOR VEHICLES.
FILED AUG. 23, 1921.
1,444,014
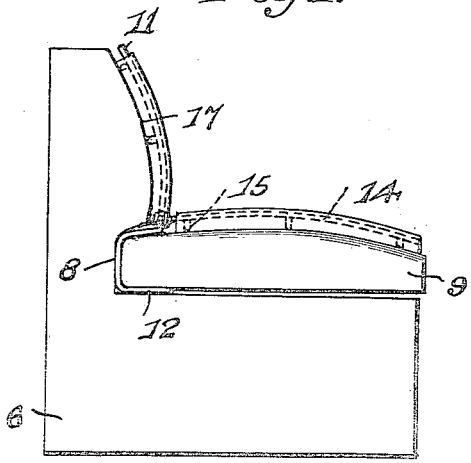
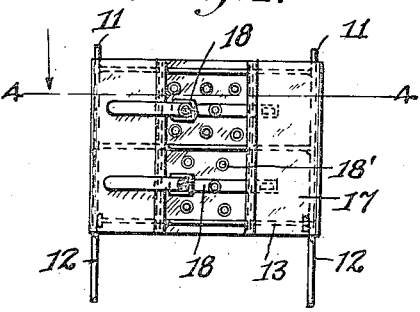
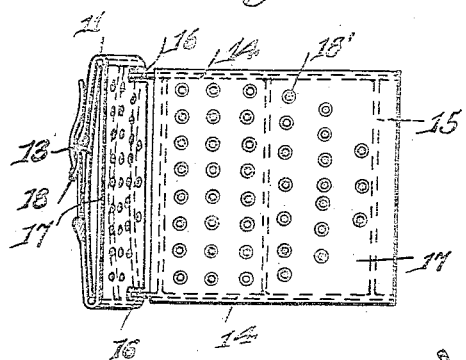
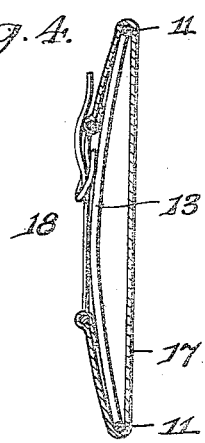
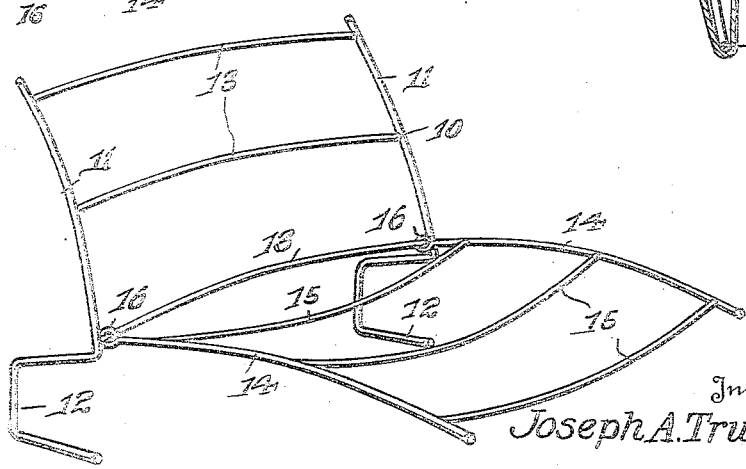
Inventor
Joseph A. Truesdell
By Bernard J. Garvey
Attorney Patented Feb. 6, 1923.

1,444,014

UNITED STATES PATENT OFFICE.

JOSEPH A. TRUESDELL, OF SOUTH JACKSONVILLE, FLORIDA, ASSIGNOR TO A. T. HILL, OF JACKSONVILLE, FLORIDA.

SEAT ATTACHMENT FOR MOTOR VEHICLES.

Application filed August 23, 1921. Serial No. 494,637.

*To all whom it may concern:*

Be it known that I, JOSEPH A. TRUESDELL, a citizen of the United States, residing at South Jacksonville, in the county of Duval and State of Florida, have invented certain new and useful Improvements in Seat Attachments for Motor Vehicles, of which the following is a specification.

The present invention consists of a seat attachment designed especially for application to the seats of motor vehicles.

Objects of the invention are to provide an attachment of this nature which will support an occupant in spaced relation to the seat thereby permitting free circulation of air between the seat and occupant; to provide a support which is constructed to conform to the curvatures of the body to thereby retain the occupant from lateral displacement; to provide a device of simple construction which may be quickly and conveniently associated with the seat; and to provide a collapsible support of this nature which may be folded together to occupy a minimum amount of space when not in use.

Other objects of the invention will be partly described and partly apparent from the following description of the present form of the invention taken in connection with the accompanying drawings wherein:—

Fig. 1 is a side elevational view of an attachment constructed in accordance with this invention illustrating its application;

Fig. 2 is a rear elevation of the back portion of the attachment;

Fig. 3 is a top plan view of the attachment per se;

Fig. 4 is a sectional view taken on the line 4—4 of Fig. 2 looking in the direction of the arrow; and Fig. 5 is a perspective view of the frame or skeleton used in the present invention.

In the drawings in order to illustrate the application of this invention a portion of a motor vehicle seat body, generally designated 6 is provided. The back of the body is upholstered and bulged outwardly as indicated at 7, in a manner well known in the art. Moreover, the back is provided with an under-cut seat receiving recess 8 of usual design. A seat or cushion 9 is mounted upon the top of the body 6 and has its rear margin engaged in the recess 8 as is usual in the art.

The device of this invention consists of a skeleton frame generally designated 10, as illustrated to advantage in Fig. 5. The frame consists of two parallel side bars 11 the lower terminals of which are bent into a substantially U-shape to provide seat receiving arms 12. These arms are engaged in the recess 8 and embrace the seat 9 as shown in Fig. 1. The bars 11 are connected by rods 13 of concavo convex configuration, the convex faces thereof being engaged with the back 7 of the seat body. In this way the end bars 11 are retained in spaced relation to the back 7. The portion of the skeleton above described comprises the back of the seat attachment and has hinged thereto a bottom portion consisting of side or end bars 14 which are connected by concavo convex rods 15. The convex faces of said rods 15 are engaged with the top of the seat 9 thereby retaining the bars 14 spaced from the latter. The rear ends of said bars 14 are looped around the lowermost of the rods 13, as indicated at 16. In this way the bottom portion of the skeleton may be folded into engagement with the back portion of the skeleton so that the attachment will occupy a minimum amount of space when not in use.

A flexible covering is mounted over the back of the skeleton likewise a separate covering over the bottom of the skeleton. The covering used for the back and bottom of the skeleton is identical, consequently, a description of one will suffice for a complete understanding of this portion of the invention. The preferred covering at the present time consists of a fabric blank 17 having the necessary integrity to withstand the pressure which will be exerted thereon. It has been found that a heavy canvas will produce eminently satisfactory results when applied as shown in the drawings. The ends of the blank are folded over the bars 11, in covering the back of the skeleton, and preferably are equipped with straps 18 which are adjustable to permit the covering to be secured to the skeleton. When arranged in this way the covering will be spaced from the concave faces of the rods 13, as shown to advantage in Fig. 4. In this way the covering will slightly flex under pressure exerted thereon by the occupant of the vehicle. In the same way the covering is spaced from the concave faces of the rods 15 to be slidably flexed under the weight of the occupant. The fabric is provided with a plurality of eyelets 18' to permit free circulation of air through the attachment as well as between the latter and the seat.

The attachment when constructed in accordance with this invention, as above outlined, and applied to the motor vehicle will support an occupant of the vehicle in spaced relation to the seat permitting free circulation of air between the seat and occupant thereby increasing the comfort of the motorist, especially the operator of the vehicle who is compelled to maintain practically the same position at all times. The skeleton frame conforms substantially to the curvatures of the body. Consequently, the frame covering will flex slightly in correspondence to said curvatures under weight of the occupant. Therefore, lateral displacement of the occupant of the vehicle is curtailed and a very desirable yieldable seat and back rest provided. It is of course to be understood that I have above described merely the crux of my invention without attempting to illustrate features of ornamentation or the like which may be added thereto within the scope of the appended claim. Moreover I am aware that various changes may be made in this device especially in the details of construction, proportion and arrangement of parts within the scope of the appended claim.

What is claimed is:—

A seat attachment for motor vehicles including a skeleton frame for engagement with the back of the seat and comprising upright bars connected by concavo convex rods the convex sides of which latter engage the seat back to space said upright bars from the latter, the lower ends of said bars being extended to lie beneath the seat proper and being shaped to snugly embrace the latter, a perforate covering stretched around said frame to engage said upright bars and being spaced from the concave sides of said concavo convex rods, a second frame including side rods pivotally connected to one of the concavo convex rods of the first said frame, and concavo convex rods connecting said side rods and having their convex faces engage with the top of the seat proper.

JOSEPH A. TRUESDELL.